INVENTOR.
SEYMOUR N. BLACKMAN
BY
ATTORNEYS

Aug. 12, 1969  S. N. BLACKMAN  3,460,390
MERCURY GLASS CLINICAL THERMOMETER WITH MAXIMUM TEMPERATURE
RECORDING TRAP AND METHOD OF MAKING THE TRAP
Filed Sept. 28, 1967  2 Sheets-Sheet 2
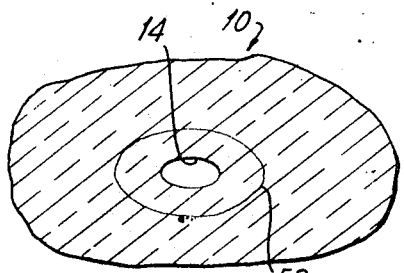
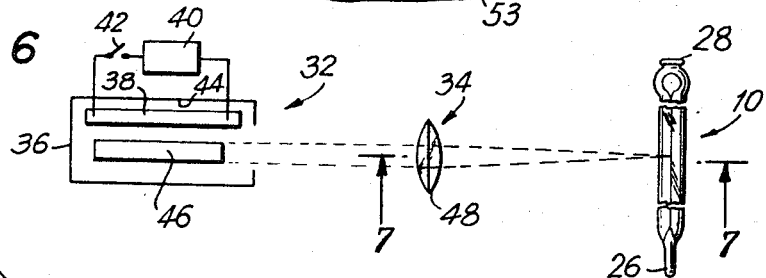
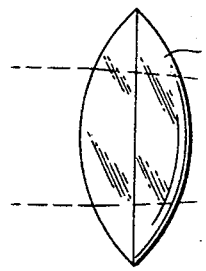
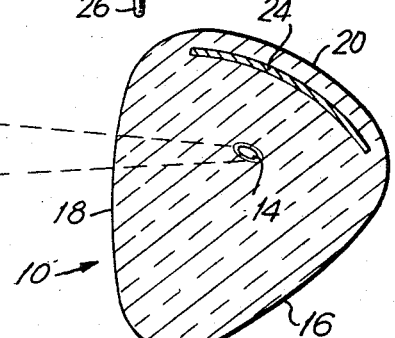
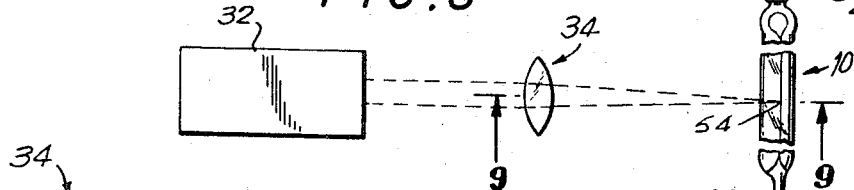
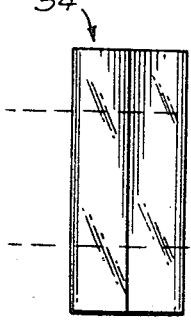
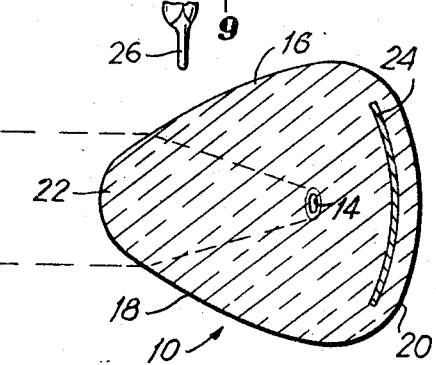
INVENTOR.
SEYMOUR N. BLACKMAN
BY
ATTORNEYS United States Patent Office 3,460,390
Patented Aug. 12, 1969

3,460,390
MERCURY GLASS CLINICAL THERMOMETER WITH MAXIMUM TEMPERATURE RECORDING TRAP AND METHOD OF MAKING THE TRAP
Seymour N. Blackman, Englewood Cliffs, N.J. (% Precision Medical Instrument Co. Inc., 41 Brook Ave., Passaic, N.J. 07055)
Filed Sept. 28, 1967, Ser. No. 671,435
Int. Cl. G01k 1/04
U.S. Cl. 73—371　　　　　　　　　　　　18 Claims

ABSTRACT OF THE DISCLOSURE

A mercury glass clinical thermometer in which the maximum temperature recording trap in the stem constitutes a resolved radial circumferential fracture pattern deep within the stem. The pattern is composed of radial fractures circumferentially intersecting the capillary bore the diameter of which is substantially the same as and aligned with the unfractured portion of the bore. The trap is formed by focussing a pulse of laser energy onto the portion of the column of mercury in the capillary bore at the desired position of the trap.

BACKGROUND OF THE INVENTION

Field of the invention

A mercury glass clinical thermometer having a maximum temperature recording trap formed with the assistance of laser energy.

Description of the prior art

Ordinary thermometers of the type employing an expansible liquid in a bulb that communicates with a bore up and down which the liquid moves as a function of temperature provide readings of temperature that continuously vary with variations in the temperature, that is to say, if the temperature rises, the height of the top of the column of expansible liquid rises as a function thereof, and vice versa for lowering of temperatures. However, such thermometers are not suitable for certain applications where it is desired to ascertain the maximum temperature which has occurred at a time after which the thermometer has been exposed to a lower temperature. This occurs principally in the measuring of body temperature by placement of a clinical thermometer in a location where it is surrounded by body tissue. The problem in such instances is that the bulb of the thermometer is positioned for exposure to a temperature which it is desired to ascertain. In this position the graduated shaft either it not in a readable position or it is extremely inconvenient to read the same. Therefore, the thermometer has to be withdrawn from such position and subsequently read. During the transition from the position in which it was exposed to a high temperature to the position in which it has to be read, the thermometer cools off sufficiently to yield a false reading.

For many years it has been the practice to overcome this problem, particularly with mercury glass clinical thermometers, by providing a construction known as a maximum temperature recording trap. This trap invariably has constituted a change in size of the capillary bore. One type of maximum temperature recording trap which is not currently in widespread use consists in a pinching of the diameter of the bore. Another has consisted in an enlargement followed by a pinching of the bore, the pinching being on the bulb side of the enlargement.

The one now in widespread use constitutes a pair of branches of a cross section less than that of the capillary bore. The branches are interposed in the capillary bore and joined to the bore at its opposite ends by opposed facing bifurcations. The formation of these branches and twin bifurcations is somewhat complex. They conventionally are made by enlarging the capillary bore in the area the trap is to be located and subsequently collapsing the enlargement in one direction perpendicular to the length of the bore (so as to cause the opposed centers of the walls of the enlargement to relatively collapse on one another) to an extent such that the center of one wall relatively moves against the center of the opposed wall.

Such prior art traps require the valuable time of skilled operators and also entail considerable subsequent testing, rejection and repair. Aside from the additional plant space and time which such traps require, the principal objection to their use has been the simple one of cost. At the present time the forming and testing of the widely used opposed twin bifurcation-type of traps, including subsequent rejection and repair, is in the vicinity of 3½ cents a thermometer. Not to be overlooked, moreover, is the fact that traps of the foregoing specific nature leave a reduced cross-section of the stem in one transverse dimension so that the thermometer is noticeably weakened at this point.

Still a further disadvantage of the twin bifurcated type of maximum temperature recording trap in a mercury glass clinical thermometer is that due to the highly irregular configuration of the trap, the readings obtained for the same temperature would vary. To understand the reason for this problem it is necessary to explain the fashion in which the aforesaid type of trap functions. When the bulb of the thermometer is exposed to an elevated temperature to be read, the mercury in the bulb expands and forces up the mercury in the column through the trap. The top of the column quickly reaches the level corresponding to the temperature to be read. The bulb of the thermometer then is withdrawn from the region of the elevated temperature, usually, in order to enable the thermometer to be read. When this happens the mercury in the bulb contracts. Such contraction tends to pull down (retreat) the mercury in the column into the bulb and as the movement accelerates, the thread of mercury breaks in the trap, usually at the thinnest portion thereof. However, before the mercury accelerates enough to break the mercury thread in the trap there is a varying amount of retreating of the tip of the column. It is this variation which prevents reproducibility, i.e., exact repetition, of readings of a thermometer having a maximum temperature trap when exposed to a specific temperature and thereafter read.

Summary of the invention

It is the principal object of the present invention to provide a mercury glass clinical thermometer having a new kind of maximum temperature recording trap, and a method for making the same, which are such that the cost of the trap is very substantially lessened and the thermometer is not noticeably weakened, that is to say, that it does not appear to break with any consistency at this point.

It is another object of the invention to provide a mercury glass clinical thermometer having a trap of the character described which substantially retains the original diameter of the capillary bore in the region of the trap, so that the readings obtained with the thermometer are reproducible and more accurate.

It is another object of the invention to provide a mercury glass clinical thermometer having a trap of the character described which can be made by comparatively unskilled workers quickly and at a low cost, for example, in the order of less than a cent a thermometer.

It is another object of the invention to provide a mercury glass clinical thermometer having a trap of the character described which thermometer can be degassed with more ease and greater speed than a thermometer having an opposed twin bifurcation-type of trap. It will be appreciated by those skilled in the art that thermometers of the named previous type have always presented difficulties in degassing because of non-symmetry of the two branches of the trap. Gas which was in a thinner branch tended to resist displacement during the degassing operation and required repetitive degassing steps, known as "air waters," that is to say, repetitive subjection to heated water baths followed by shaking off the mercury column in the direction away from the bulb for the removal of gas. This is avoided in accordance with the present invention because the trap now is of uniform diameter so that usually a single rise of mercury suffices to transfer the gas from the trap to the top of the mercury column, not even requiring a degassing step.

It is another object of the present invention to provide a mercury glass clinical thermometer having a trap of the character described which thermometer is of uniform external diameter and therefore more aesthetically pleasing.

It is another object of the invention to provide a mercury glass clinical thermometer having a trap of the character described which is so configured that impurities in the mercury do not tend to lodge in the trap as they have heretofore in opposed twin bifurcated type of traps having unduly restricted capillary cross-sections, thermometers with the former type of traps, after partial obstruction of the trap, being known in the trade as "hard shakers."

It is another object of the invention to provide a mercury glass clinical thermometer having a trap of the character described which can be placed with respect to the bulb and graduations with a high degree of accuracy so that more of the shaft can be used for graduation purposes and so that there is a greater uniformity among a group of thermometers.

It is another object of the invention to provide a mercury glass clinical thermometer having a trap of the character described which lends itself to automated manufacturing techniques, as distinguished from the opti-manual, one-at-a-time, techniques heretofore employed.

It is another object of the invention to provide a mercury glass clinical thermometer having a trap of the character described which enables the thermometer to be shaken down more easily after each reading and also enables the mercury to be shaken in a direction away from the bulb and off the trap more easily, a step which is practiced at several stages in the manufacture of the thermometer for purposes other than formation of the trap.

It is another object of the invention to provide a mercury glass clinical thermometer having a trap of the character described which prevents appreciable retreat of the mercury column during a laser roll-up operation of the type mentioned in U.S. Patent No. 3,316,076, the retreating heretofore experienced with such roll-up being caused by the employment of an opposed twin bifurcated trap.

Other objects of the invention in part will be obvious and in part will be pointed out hereinafter.

The invention accordingly consists in the features of construction, combinations of elements, arrangements of parts and series of steps which will be exemplified in the mercury glass clinical thermometer and trap making method hereinafter described and of which the scope of application will be indicated in the appended claims.

Brief description of the drawings

In the accompanying drawings in which is shown one of the various possible embodiments of the invention.

FIG. 5 is a sectional view taken substantially along the line 5—5 of FIG. 4;

FIG. 6 is an elevational schematic view of an apparatus for practicing the present invention;

FIG. 7 is an enlarged sectional view taken substantially along the line 7—7 of FIG. 6 and showing the relative position between the optical axis of the laser beam and the cross-section of the thermometer in which a trap is being formed; and FIGS. 8 and 9 are views similar to FIGS. 6 and 7, respectively, of an apparatus embodying a modified form of the invention.

Description of the preferred embodiment

Figure 1:
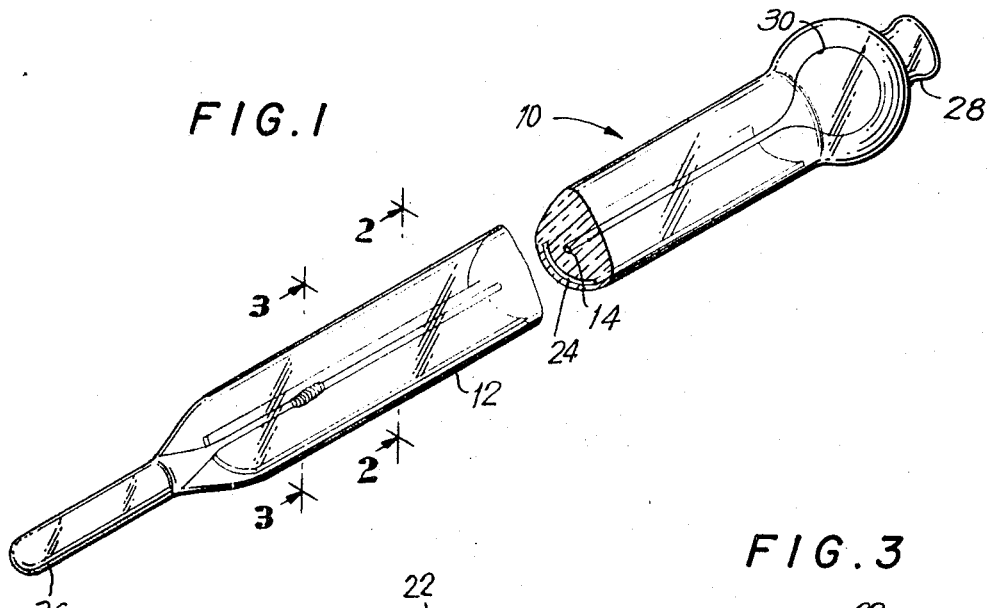
FIG. 1 is an enlarged fragmentary perspective view of a mercury glass clinical thermometer incorporating a fracture trap embodying the present invention.

In general, the objects of this invention are achieved by providing a thermometer which at the time the trap is to be made may either be graduated or ungraduated, preferably the latter, and which consists of a glass stem with a capillary bore thereon. At one end the stem has fused to it a bulb. At the other end of the thermometer the bore is sealed, and usually is provided with a calibration chamber that terminates at the associated end of the bore immediately beneath the seal. The thermometer, which, if ungraduated, is usually referred to in the trade as a "blank," has mercury in the bulb and at least part way up the capillary bore in the stem, the mercury being a continuous mass from the bulb into the capillary bore. Optionally, the mercury may extend all the way up to the calibration chamber.

The thermometer blank is placed in such temperature surroundings that the mercury column in the bore extends at least slightly past, e.g., one-quarter inch past, the region where the trap is to be formed. In conventional manufacture of thermometers there usually is enough mercury in a thermometer blank for the top of the mercury column in the capillary bore to extend past the conventional site of the trap at room temperature.

A beam of laser energy is concentrated on the mercury column at the proposed site of the trap. Preferably, the beam is in the form of a pulse focused in the vicinity of the mercury. It has been found that when this pulse of laser energy strikes a mercury filled capillary bore for a sufficiently long time and at a sufficient rate which will vary with the glass composition a unique type of fracture ensues. The reason for the fracture is not known. It is believed that the fracture is caused by sudden volatilization of a very short length of the mercury thread in the capillary bore at the trap sites with consequent shock imparted to the glass surrounding the bore, the shock resulting in a fracture which is localized at the site of the trap axially of the bore and also localized radially, so that the fracture extends only for a limited distance away from (is close to) the bore and stops considerably short of (is remote from) the skin of the thermometer stem. Moreover, the fracture is unusual in that any given fracture, after extending a short distance radially away from the capillary bore, turns back into another radial fracture, axially displacer from the first, which extends radially toward the bore. In other words, any given fracture is of the re-entrant type. It has been observed that in almost all instances a fracture, after extending radially away from the bore, which it circumferentially intersects, extends in a substantially longitudinal direction, i.e., roughly parallel to the bore, before turning radially back once again toward the bore. The fractures are not exactly radial in that they are not in a plane precisely perpendicular to the bore, but rather are at various random angles. However, due to the fact that the fractures are re-entrant, they do not terminate at points radially remote from the bore ending in stress zones which would tend over a period of time to cause radially outward extension of the fractures. Rather, due to their re-entrant nature, they are, what might be referred to as "resolved," that is to say, they are, in effect, endless, starting at the bore, then extending axially and finally finishing at the bore. Depending upon the particular physical structure of the specific glass stem in which the fractures occur, some radial fractures lie in planes approximately perpendicular to the bore so that each fracture constitutes a circumferential line (intersection) around the bore at its point of emanation from the bore; and in other cases the radial fractures spiral around the bore, such latter fractures likewise forming essentially circumferential intersections with the bore. However, in all cases the fractures are resolved. The aforesaid fractures are sometimes referred to herein as a "resolved radial circumferential fracture pattern."

It has been found that these fractures act as a maximum temperature recording trap. Upon cooling of the thermometer the mercury thread will usually break at the trap at the fracture intersection which is closest to the bulb. However if it does not break there, it will break at a fracture intersection somewhat further removed from the bulb. Moreover, the sundry fractures act as what might be called "anchor points," to restrict and prevent axial flow of the mercury which in turn presents retreat of the mercury during the various manipulative steps incident to the formation of the thermometer.

It is to be stressed that the laser energy is not such as to melt the glass, but rather such as to fracture it in the foregoing manner and that the fracturing does not take place indiscriminately at the axially limited part of the transverse cross-section of the glass, but rather is localized radially to the vicinity of the capillary bore, e.g., is deep within the glass and remote from the external surface of the stem. As has been indicated, it is believed that this axial and radial localization is due to the volatilization of a limited quantity of mercury. However, the phenomenon may occur for other causes. In any event, it is necessary to have an opaque body, that is to say, a body opaque to laser energy, at the point where the resolved radial circumferential fracture pattern is to be formed.

Another unusual characteristic of the fracture pattern is that it neither enlarges nor restricts the capillary bore at the trap, nor does it disalign the same. The bore is left essentially unaltered except for the circumferential intersections of the radial fractures with its surface. This is of particular advantage for degassing the mercury and for obtaining uniform readings for an individual thermometer, as well as obtaining uniform reading among a group of thermometers.

Referring now in detail to the drawings, and more particularly to FIGS. 1–7, the reference numeral 10 denotes a typical clinical glass thermometer blank. Said blank is composed of glass, the usual glass being Corning Normal thermometer lead glass, Jena-type 16,111 or equivalent. The blank includes a stem 12 having a capillary bore 14 therein. The cross-section of the bore is roughly elliptical. The bore has been shown out of proportion in FIGS. 1–3 in order to render the same visible. Actually the bore is of capillary cross-section, so that to the scale illustrated in these figures it would hardly be seen. The cross-sectional configuration of the stem is approximately that of an isosceles triangle with equal length sides 16, 18 and a shorter base side 20. In a typical thermometer stem the distance from the side 20 to the opposite apex is 0.190". The apices joining the sides of the triangle are rounded. The sides themselves are rounded to a lesser curvature, so that they are slightly outwardly convex. The apex 22 between the two sides 16, 18 is somewhat broader in extent than the other two apices and acts as a cylindrical lens to magnify the mercury column, as is well known.

Also, for the purpose of simplified reading of the mercury column, the thermometer blank 10, as is conventional, has an opaque enamel panel insert 24, usually white or yellow, in the back of the bore, i.e., between the bore and the short side 20 of the stem.

At one end of the thermometer blank a bulb 26 is integrally joined to the stem. The bulb terminates on the stem side in a tapering section which is joined to the capillary bore 14, so that there is a passageway provided from the bulb to the capillary bore.

The end of the stem remote from the bulb terminates in a seal 28, the corresponding end of the capillary bore, i.e., the end remote from the bulb, terminating in a calibrating chamber 30 adjacent the seal. The presence or absence of this chamber is entirely optional and has no effect uopn the present invention. It also may be mentioned that the bulb 26 may be of various types well known to the art, such, for example, as are associated with the so-called "oral cylindrical," "rectal pear" or "stubby" thermometers.

The blank 10, preparatory to the incorporation of a trap therein pursuant to the present invention, contains a mass of mercury which fills the bulb 26 and extends up into the capillary bore 14. The top of the column of mercury may be anywhere within the stem, but at least must be above the region where the maximum recording temperature trap is to be situated so that mercury extends through said region. Ordinarily, there is sufficient mercury in the blank at this time, which preferably is before calibration and registry of the column with the calibrated markings, to completely fill the stem and run over into the calibrating chamber 30 at room temperature.

It is important to reiterate that the thermometer blank 10 which is now to be provided with a maximum temperature recording trap pursuant to the instant invention may or may not at this time have calibration markings thereon, and may or may not have had excess mercury removed therefrom to match the mercury column to the calibrations. It is also important to note that after the trap has been formed, pursuant to the present invention, the calibrations may be incorporated therein in any manner well known to the art and be of any type, such, for instance, as etched and filled, frit marked or stain marked. Moreover, the excess mercury may be removed from the blank in any manner well known to the art.

To provide the fracture trap of the present invention certain equipment is necessary, the same being shown in FIG. 6. This equipment includes a source 32 of laser beam energy and a means 34 for focusing this energy beam on the capillary thread of mercury in the bore 14 of the thermometer at the trap location.

The source of laser beam energy is conventional. Preferably, there is employed a source which will emit a pulse of beam energy as distinct from a source which emits a continuous beam of energy, inasmuch as in the latter case it is necessary to interrupt the stream of energy so as to create a pulse. As illustrated, there is disclosed a source of laser beam energy of the pulse type. Said source includes a casing 36 in which there is located a flash lamp 38 energized from a power supply 40 through a manually operable control switch 42. The interior of the casing adjacent the flash lamp is specular, as at 44, for reflection purposes. Adjacent the flash lamp and within a region toward which light energy is directed by the specular inside of the casing is a ruby laser rod 46.

By way of example, a specific source of laser energy which has operated satisfactorily is a Maser Optics model 552 laser head in which the interior of the casing is elliptical in configuration and silver plated for reflectivity. The flash lamp 38 and the ruby rod 46 are mounted at the focal points of the ellipse, so that there is a maximum transfer of light energy from the flash lamp to the ruby rod. The flash lamp is an Edgerton, Germishausen & Grier model FX42A Xenon lamp. The ruby laser rod 46 is one-quarter inch in diameter, circular in cross-section and three and one-quarter inches long. The end faces are parallel to within three seconds of arc and are finished to a flatness of better than one-tenth of a wavelength. Both end faces are dielectric coated. The rear end face is coated for total reflectivity and the output and face is coated for 70% reflectivity. The output of the ruby rod is 6943 A., accordingly being in the red portion of the visible spectrum. The rod has a one joule output capability. The power supply has a capability of 400 joules input into the flash lamp 38.

In the operation about to be described the power source 40 supplies a power of 1.35 kv. into a capacitor of 400 mfd. which in turn delivers a pulse to the flash lamp. The output of the laser ruby rod during the trap-forming operation is such as to deliver a pulse of 0.2 joule in a time period of 500 microseconds.

The optical axis of the output beam of the ruby rod, i.e., of the source of laser beam energy, is trained on a lens 48 constituting the means 34 for focusing the laser energy. The lens is of a convergent type, being either doubly convex, as illustrated, or planoconvex, and having its optical axis centered on the optical axis of the ruby rod. The plane of the lens is perpendicular to the optical axis of the rod. Hence, the energy output leaving the lens is convergent.

The lens is of symmetrical configuration about its optical axis so that it will focus to approximately a point, actually to a tiny three-dimensional space due to imperfections in the lens. At this focus point the thermometer blank 10 is located. Preferably the thermometer blank is so oriented that its length is perpendicular to the axis of the optical system. The focus point of the lens specifically is located at the capillary bore which is merely another way of saying that it is located at the thread of mercury in the capillary bore.

The length of the thermometer is so adjusted with respect to the optical axis of the output side of the lens 48 that the focus point of the lens is situated at the desired site of the maximum temperature recording trap. In other words, the laser energy is focused on the mercury column at the position where the maximum recording trap is to be located. It is more convenient for commercial operation to have the length of the bore perpendicular to the optical axis of the laser system, since with the entire bore on the optical axis it is merely necessary to axially adjust any given thermometer to set the focus point at the desired trap location.

Suitable means (not shown) is provided to hold the thermometer blank in the aforesaid relation to the laser system although, if desired, this can be done by hand.

It will be observed that the configuration of the lens 48 is so chosen that the lens focuses the laser energy to approximately a point, that is to say, a point as distinguished from a line, this latter type of optical system being described in another embodiment of my invention subsequently.

In order to prevent the configuration of the cross-section of the glass stem of the thermometer from materially interfering with focusing of the laser energy at a point on the mercury column, the thermometer blank is so turned (as shown in FIG. 7) that the converging beam of laser energy passes through a substantiallly flat side 16 or 18 of the thermometer blank. The slight convexity of this side does not materially interfere with the focusing of the laser energy, as it would if the laser energy were directed, say, through the rounded lens apex 22 of the cross-sectional configuration of the stem.

With the thermometer blank positioned in the foregoing manner in the aforesaid equipment, the source of laser energy is activated to deliver a pulse of laser energy from the rod for a time and at a rate sufficient to form the fracture pattern. A specific time and amount of energy have been set forth above for the thermometer described. This pulse passes through the lens and is focused on the mercury column at the desired position of the maximum temperature recording trap. When this energy strikes the mercury column, a transformation is experienced in the mass of glass surrounding the column at the focus point of the lens. It is believed that this transformation has occurred because of a shock wave or waves consequent upon the sudden volatilization of a limited mass of mercury at the trap location, in effect, a minor explosion. However, it is not meant by this explanation to preclude any other physical explanation of the causative effect of the fracture.

Figures 2, 3:
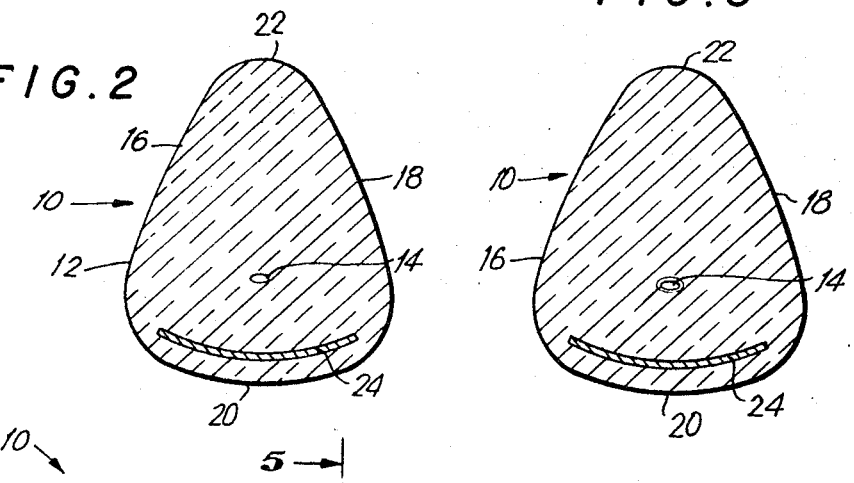
FIG. 2 is an enlarged transverse cross-sectional view through a portion of the thermometer above the trap, the same being taken substantially along the line 2—2 of FIG. 1.
FIG. 3 is a view similar to FIG. 2, but taken substantially along the line 3—3 of FIG. 1 in a position to illustrate a transverse cross-sectional view of the fracture trap.
Figure 4:
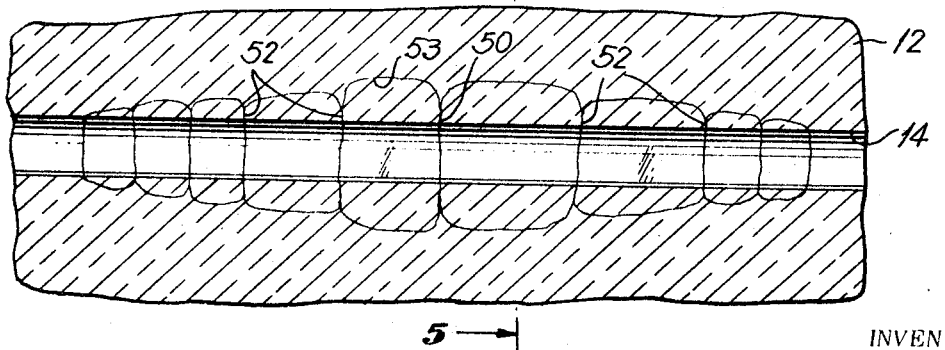
FIG. 4 is a highly enlarged longitudinal cross-sectional view through the thermometer and capillary bore in the region of the fracture trap, the same constituting a line rendering of a microscopic view of the fracture trap.

The consequence of the transformation is a highly unique type of fracture pattern which has been shown to the best extent possible in FIGS. 3, 4 and 5. These figures constitute a rendering by way of a line drawing of a visual examination under a microscope of a non-sectional portion of the thermometer stem in the region of the fracture trap.

As observed, the fracture trap consists of a central radial major fracture 50 and several radial minor fractures 52 on axially opposite sides of the major fracture. The major fracture is of the greatest radial extent. The minor fractures are of lesser radial extent, being progressively smaller in relation to their axial distance from the major fracture. The minor fractures appear quite distinctly in the focal plane of the microscope. However, the major fracture has a more diffuse appearance which it is not possible to reproduce in the drawings. The fractures usually are approximately perpendicular to the length of the capillary bore, i.e., are truly circumferential. However, in some instances fractures have been observed which spiral around the length of the bore, these being effectively circumferential. Usually, the fractures individually are in single planes which are substantially perpendicular to the length of the bore. Each radial fracture, which is indicated is of a two-dimensional nature in that any small segment of the fracture seems to be approximately flat, although it may be inclined off a perpendicular to the longitudinal axis of the bore. Indeed, as appears from microscopic examination, the angle of any given radial fracture varies progressively around the circumference of the bore so that it has an effect, if only a narrow width of it is being considered, of a ribbon which twists constantly perpendicular to its length.

A truly unique part of these radial fractures and what makes them so valuable in connection with the formation of the recording trap is that after extending for a short distance radially away from the bore the fractures turn as at 53 approximately 90° to progress in a generally longitudinal direction (considered in a plane including the longitudinal axis of the bore), that is to say, approximately in a cylindrical configuration, and upon reaching the next successive fracture they turn in to constitute the outer end of such next radial fracture.

Hence, all of the radial fractures are, so to speak, "resolved," i.e., have no terminations within the mass of the glass, their only terminations being at the surface of the capillary bore itself. Thereby, there is no tendency for any fractures to become extended in a direction radially outwardly toward the skin of the stem. If such were the case, obviously the thermometer would be appreciably weakened and eventually would break, even if it were not handled.

Another unique feature of the fractures is that they do not noticeably increase or decrease the diameter of the capillary bore, nor do they offset any one part of the bore with respect to an immediately adjacent part, nor do they noticeably fragment the glass and thereby project glass particles into the bore where they would interfere with free flow of the mercury therein. Due to these latter characteristics the fracture trap is most useful in the use and manufacture of the thermometer. For instance, the fracture trap, due to the absence of a variation in the size of the bore and due to the absence of any offsetting in the bore, does not interfere with degassing and does not tend to cause particles to wedge therein and does not encourage retreat of mercury during certain conventional steps in the formation of a finished thermometer.

As is best seen in FIGS. 4 and 5, the fractures cause the transformation of a very short length of glass immediately surrounding the bore into a formation resembling a series of end-to-end abutted plugs with the layer plugs at the center and the plugs becoming progressively smaller toward the ends. The plugs, however, are of no regular configuration, although they are roughly circular in external configuration (see (FIG. 5).

The formation, preferably, is of very restricted length; for example, from about 0.02" to about 0.06". By way of example, a typical length of a series of fractures forming the fracture trap is about from end to end 0.025", although this is not to be construed as a limitation upon the invention, and a typical outer diameter at the major fracture is 0.008". These dimensions will vary somewhat with the types of glass used, the external dimensions of the internal dimensions and configurations of the capillary bore, the duration of the laser pulse, and the rate at which laser energy is delivered. The variables which are controllable are the length and intensity of the pulse which are adjusted so as to obtain a fracture trap of very restricted length.

It has been observed that when the fracture trap is in operation, either during normal usage of the thermometer or during manufacture of the thermometer, as, for example, during the emplacement of the graduations or the matching of the mercury column to the graduations, the break in the mercury column above the bulb takes place at the radial fracture closet to the bulb; although with increasing severity of shaking (the application of axial force to the mercury column) the break will take place at progressively higher ponts. It also has been observed that due to the multiplicity of radial fractures, the trap exerts a considerable braking action on movement of the mercury column, so that the action of the trap is highly predictable and reproducible.

It may be mentioned that the location at which the fracture trap is made has no bearing upon the invention, a location simply being selected which is such that there is mercury in the bore at the desired site of the trap.

An alternate form of method and apparatus embodying the invention is shown in FIGS. 8 and 9. In this form the same source 32 of laser energy is utilized. However, the means 34 for focussing the energy on the thermometer blank 10 is slightly different. It will be recalled that the focussing means shown in FIG. 6 is a double convex lens 48 which is symmetrical about the optical axis of the ruby rod. However, the focussing means of FIGS. 8 and 9 is, instead, a cylindrical lens, as illustrated, a double convex cylindrical lens, which, instead of focussing the energy to substantially a point, focusses the energy to substantially a line 54, such focal line being perpendicular to the optical axis of the ruby rod and laser optical system and also perpendicular to the thread of mercury in the capillary bore of the thermometer blank. Because a focal line is generated, the energy is not yet fully concentrated on the mercury thread. It still is necessary to concentrate the energy in a horizontal plane including the aforesaid focal line. This is accomplished, as shown in FIG. 9, by the thermometer lens 22. Said thermometer lens, it will be remembered, acts as a magnifying glass for reading the mercury in the column. The same lens, acting as an optical laser lens, concentrates the laser energy transversely (previously having been concentrated vertically by the cylindrical lens 34) on the specific proposed site of the fracture trap.

At present this alternate modification of the invention is not the preferred one, inasmuch as it involves two variables. One of the variables which is the same variable as is involved in the first form of the invention, is the distance along the optical axis of the laser system between the capillary bore and the side of the stem facing the ruby rod. This varies slightly from thermometer to thermometer in a given batch and also varies somewhat from batch to batch. A suitable adjustment must be made for this in placement of the thermometer during formation of the trap. However, it has been found that this adjustment is comparatively slight and often negligible. The second variable is the radius of curvature of the magnifying lens 22. This too varies from thermometer to thermometer and from batch to batch and has thus far been found to be significant, requiring further adjustment in the position of the thermometer so as to substantially precisely locate the focus point of the laser beam at the site of the fracture trap. Hence, as at the present time, it is preferred to use the first form of the invention.

It thus will be seen that there are provided articles and methods which achieve the several objects of the invention and which are well adapted to meet the conditions of practical use.

As various possible embodiments might be made of the above invention and as various changes might be made in the embodiment above set forth, it is to be understood that all matter herein described is to be interpreted as illustrative and not in a limiting sense.

Having thus described the invention, there is claimed as new and desired to be secured by Letters Patent:

1. A method of making a maximum temperature recording trap in a mercury glass clinical thermometer, said method comprising:
   (A) providing a glass clinical thermometer blank having a stem with a bulb at one end thereof, the interior of the bulb communicating with a capillary bore extending axially of the stem and having a mass of mercury in the bulb and extending into the capillary bore at least through the location where the trap is to be situated, and
   (B) concentrating a pulse of laser energy in the vicinity of the mercury in the capillary bore at the desired trap location for a time and in a quantum such as to transform a short length of the glass surrounding and close to the capillary bore in the stem at said location and remote from the external surface of the stem into a resolved radial circumferential fracture pattern.

2. A method as set forth in claim 1 wherein the glass surrounding the capillary bore is transformed into a resolved radial fracture pattern without changing the diameter of the bore.

3. A method as set forth in claim 1 wherein the glass surrounding the capillary bore is transformed into a resolved radial fracture pattern in which the ends of the fractures at the surface of the bore are substantially perpendicular to the length of the bore.

4. A method as set forth in claim 1 wherein the resolved radial fracture pattern constitutes a plurality of radial fractures joined to adjacent radial fractures by longitudinal fractures spaced from the bore.

5. A method as set forth in claim 4 wherein the radial fractures are of progressively lesser radial dimension in directions longitudinally remote from the center of the pattern.

6. A method as set forth in claim 1 wherein the fracture pattern constitutes longitudinally adjacent approximately cylindrical plugs concentric with the bore.

7. A method as set forth in claim 6 wherein the plugs are of progressively lesser diameter in directions longitudinally remote from the center of the pattern.

8. A method as set forth in claim 1 wherein the thermometer blank has at least one substantially flat face which is transparent to laser energy, and wherein said face is arranged substantially perpendicular to the axis of propagation of the pulse of laser energy.

9. A method as set forth in claim 8 wherein a lens is employed to concentrate the pulse of energy and wherein the lens is symmetrical around said axis of propagation.

10. A method as set forth in claim 1 wherein the stem includes a cylindrical lens, wherein the stem is arranged with said lens facing and perpendicular to the axis of propagation of the pulse of laser energy, and wherein a second lens is employed to assist in concentrating the pulse of laser energy, said second lens constituting a cylindrical lens between a source of laser energy and the stem, said second cylindrical lens having a cylindrical axis perpendicular to the axis of propagation of the pulse of laser energy and to the cylindrical lens of the thermometer blank.

11. A mercury glass clinical thermometer, said thermometer comprising a stem with a bulb at one end thereof, the interior of the bulb communicating with a capillary bore extending axially of the stem and a mass of mercury in the bulb and extending into the capillary, said trap having been formed by concentrating a pulse of laser energy in the vicinity of the mercury in the capillary bore at the trap location for a time and in a quantum such that a short length of the trap surrounding and close to the capillary bore in the stem at said location and remote from the external surface of the stem has been transformed into a resolved radial circumferential fracture pattern.

12. A mercury glass clinical thermometer with a maximum temperature recording trap, said thermometer including a stem with a bulb at one end thereof, the interior of the bulb communicating with a capillary bore extending axially of the stem and a mass of mercury in the bulb extending into the capillary, said trap constituting a resolved radial circumferential fracture pattern in a short length of the glass surrounding the capillary bore and remote from the external surface of the stem.

13. A mercury glass clinical thermometer as set forth in claim 12 wherein the diameter of the bore is the same at the trap as beyond the trap.

14. A mercury glass clinical thermometer as set forth in claim 12 wherein the ends of the fractures at the surface of the bore are substantially perpendicular to the length of the bore.

15. A mercury glass clinical thermometer as set forth in claim 12 wherein the pattern constitutes a plurality of radial fractures joined to adjacent radial fractures by longitudinal fractures spaced from the bore.

16. A mercury glass clinical thermometer as set forth in claim 15 wherein the radial fractures are of progressively lesser radial dimension in directions longitudinally remote from the center of the pattern.

17. A mercury glass clinical thermometer as set forth in claim 12 wherein the fracture pattern constitutes longitudinally adjacent approximately cylindrical plugs concentric with the bore.

18. A mercury glass clinical thermometer as set forth in claim 17 wherein the plugs are of progressively lesser diameter in directions longitudinally remote from the center of the pattern.

References Cited

UNITED STATES PATENTS

| | | | |
|---|---|---|---|
| 2,752,785 | 7/1956 | Laing | 73—371 |
| 3,183,721 | 5/1965 | Kaynan | 73—371 |
| 3,316,076 | 4/1967 | Blackman | 65—30 |
| 3,377,837 | 4/1968 | Ayres | 73—371 |

LOUIS R. PRINCE, Primary Examiner

W. A. HENRY II, Assistant Examiner

U.S. Cl. X.R.

65—56; 73—432